July 13, 1948.   J. A. LOVE   2,445,145
IMPLEMENT HITCH
Filed Aug. 2, 1946   3 Sheets-Sheet 1
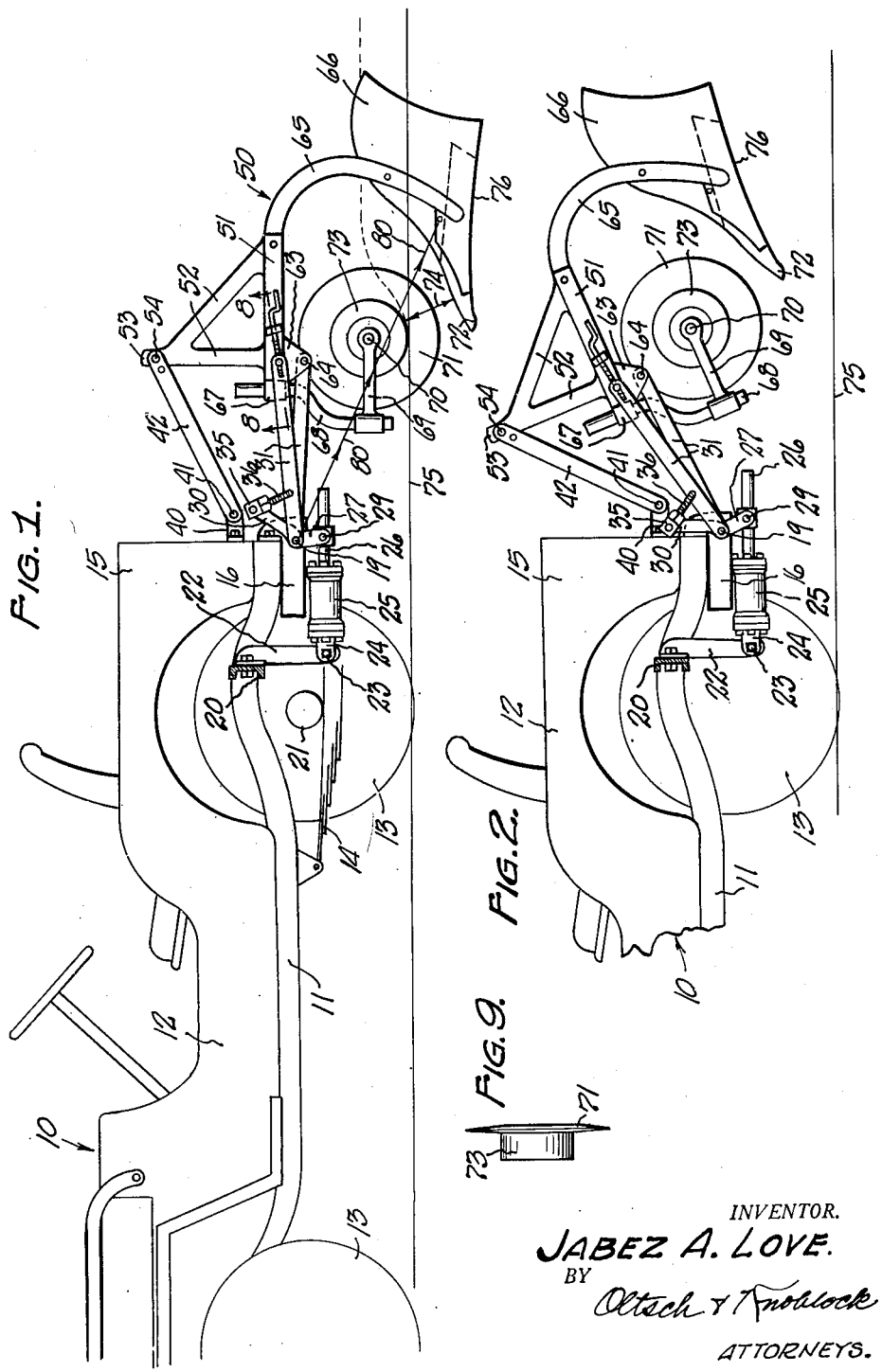
INVENTOR.
JABEZ A. LOVE.
BY
Oltsch & Knoblock
ATTORNEYS.

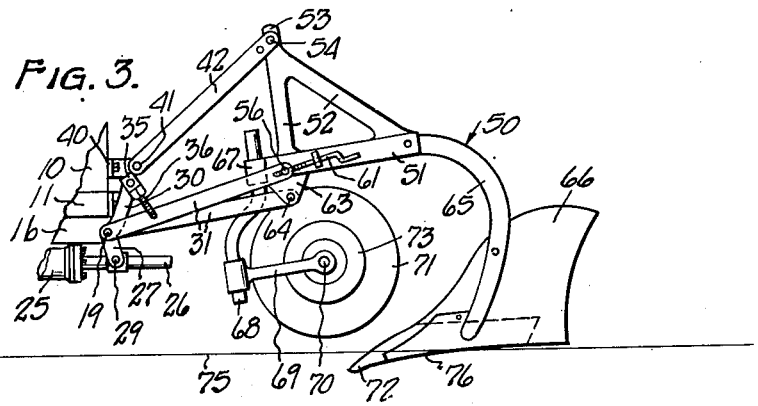
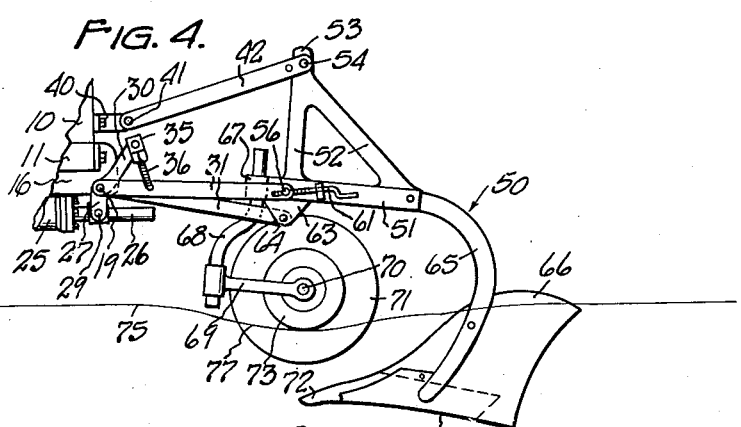
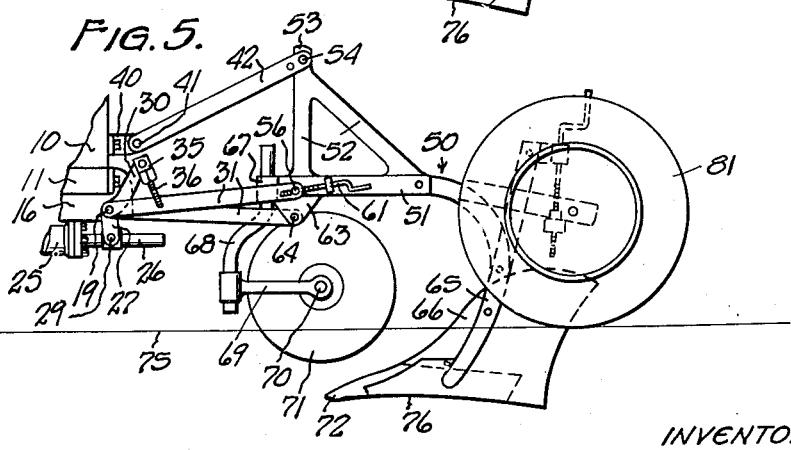

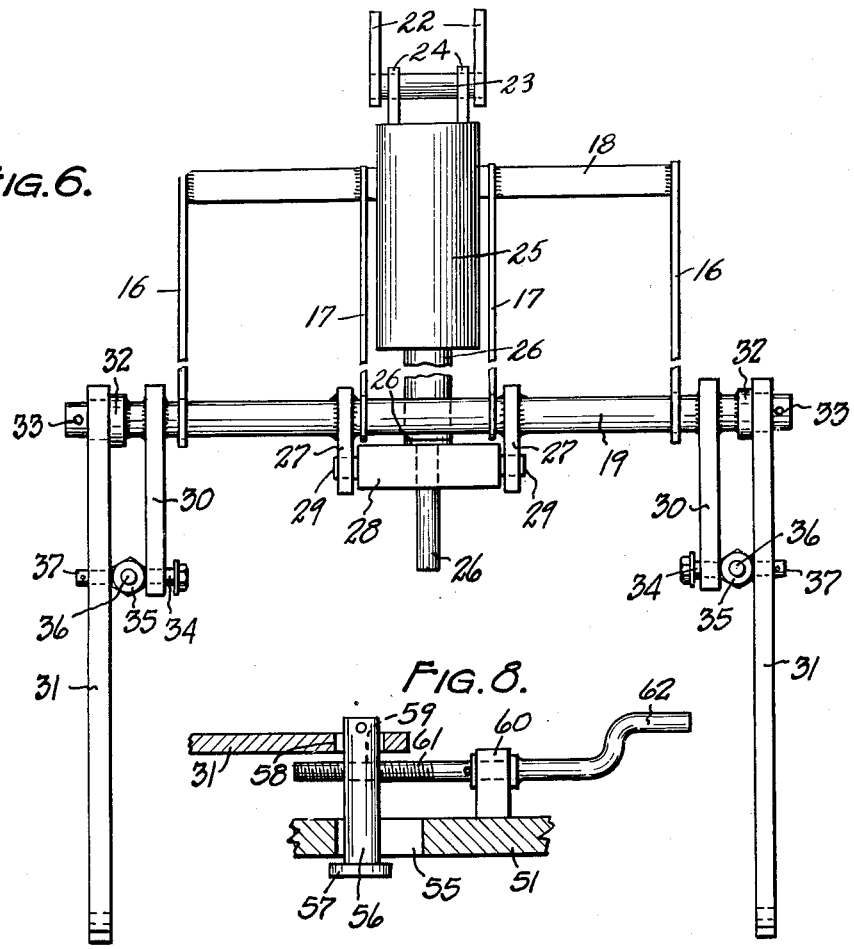
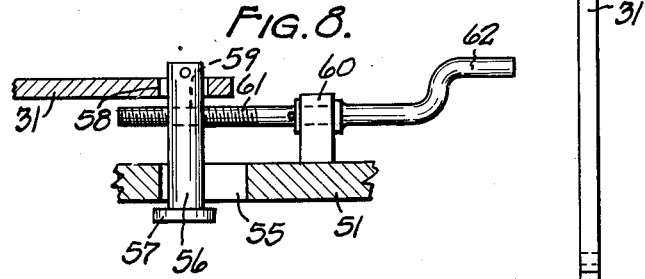
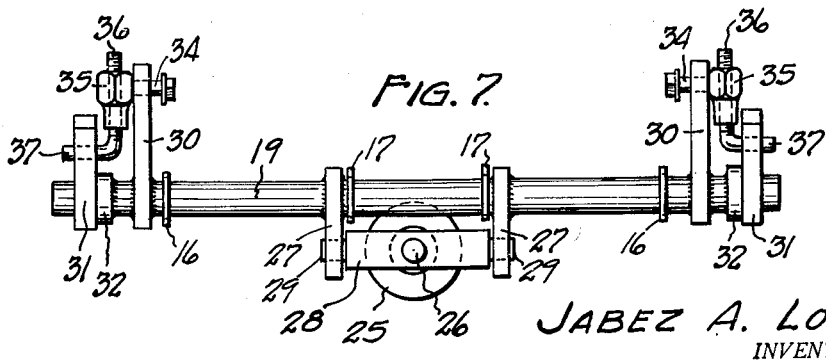

Patented July 13, 1948

2,445,145

UNITED STATES PATENT OFFICE 2,445,145

IMPLEMENT HITCH

Jabez A. Love, Eau Claire, Mich.

Application August 2, 1946, Serial No. 687,839

10 Claims. (Cl. 97—47)

This invention relates to improvements in implement hitches, and particularly to hitches of the lift-up type for use in conjunction with agriculture implements.

The primary object of the invention is to provide a novel, simple, effective and inexpensive hitch construction of this character.

A further object is to provide a hitch construction of the lift-up type which may be applied to a spring mounted motor vehicle, such as the quarter-ton 4-wheel drive automotive vehicles commonly known as "jeeps."

A further object is to provide a device of this character which may be applied to an automotive vehicle in such a manner that the use of the vehicle for other purposes than as a towing tractor for an agricultural implement is not interfered with, and so that loose parts, and parts projecting from the vehicle, are reduced to a minimum.

A further object is to provide a device of this character with adjustment means by which the transverse attitude or inclination of the laterally spaced draft points between the hitch and the implement may be controlled or regulated.

A further object is to provide a device of this character by means of which connection and disconnection of implement draft members with the vehicle may be accomplished easily, rapidly and simply.

A further object is to provide a device of this character which is adapted to tilt agricultural implements connected therewith as it lifts and lowers the same to change the ground working attitude of the implement at different operative positions of the hitch mechanism.

A further object is to provide a combination of a tractive member, a lift type hitch and a plow, wherein the depth of the plow is maintained at a normal or desired setting by the combination of the normal downward suction of the plow, the attitude of the hitch for pull on the plow in neutral position for the desired depth, and by a depth wheel which offsets or counterbalances the normal amount of suction effect of the plow at the desired or correct depth.

A further object is to provide a combination of a lift-up hitch, a tractor and an implement with spring means operative to change the setting of the implement as the tractive load imposed by the implement varies incident to variations in the condition of the soil being encountered.

A further object is to provide a combination of a spring suspended tractor, a lift-up hitch mechanism connected thereto, and a plow rigidly connected to the hitch in such a manner that any increase in the load or pull between the implement and the tractor incident to a change in ground conditions acts against the spring of the vehicle to change the attitude of the vehicle, the hitch and the plow, to reduce the working depth of the plow and thereby counterbalance the increase in the load.

Other objects will be apparent from the following description and specification.

In the drawing:

Fig. 1 is a side view of the device applied to an automotive vehicle having one of its wheels removed to illustrate the connection of the parts to the vehicle and illustrating a plow connected to the hitch mechanism at normal working depth.

Fig. 2 is a fragmentary side view illustrating the hitch and implement in lifted or elevated position.

Fig. 3 is a fragmentary side view illustrating the plow in starting position penetrating the ground only slightly and above normal working depth of the plow.

Fig. 4 is a fragmentary side view illustrating the position of the parts with the plow below normal or desired working depth.

Fig. 5 is a fragmentary side view of a modified embodiment of the invention.

Fig. 6 is an enlarged bottom plan view of the hitch mechanism.

Fig. 7 is a rear end view of the hitch mechanism.

Fig. 8 is an enlarged fragmentary detail sectional view taken on line 8—8 of Fig. 1.

Fig. 9 is an edge view of a coulter blade used in the device.

Referring to the drawings which illustrate the preferred embodiment of the invention, the numeral 10 designates a motor vehicle, such as a quarter-ton, 4-wheel drive vehicle, commonly known as a "jeep." This vehicle has a frame 11 supporting a body 12 and supported upon wheels 13 by springs 14 in the manner well understood in the art. A portion 15 of the body preferably projects beyond the rear wheel of the body and may constitute a box portion or a rear passenger compartment.

The hitch mechanism is best illustrated in Figs. 6 and 7 and comprises a pair of outer longitudinal rigid frame members 16 and a pair of inner longitudinal rigid frame members 17, which are secured to the frame member 11 in a rigid manner as by welding or the like and which may be interconnected at their forward ends by a cross bar 18 also suitably welded or otherwise secured to the vehicle frame. The arms 16 and 17 preferably extend longitudinally of the vehicle and below the frame and body of the vehicle with their rearmost portions projecting slightly beyond the rear of the body portion 15 of the vehicle. A rock shaft 19 is journaled in the projecting portions of the arms 16 and 17 preferably being positioned below the vehicle frame and substantially in vertical alignment with the rear of the vehicle body, as best illustrated in Fig. 1.

A cross bar 20 is preferably secured to the vehicle frame 11 forwardly of the rear end thereof and adjacent the axle 21 of the vehicle and rigidly mounts a pair of depending vertical arms 22 which project below the level of the arms 16 and 17. A cross pin 23 is journaled in the arms 22 at the lower end thereof and serves to pivotally support one or more ears or lugs 24 projecting rigidly from the end of a cylinder 25. The cylinder 25 has a piston (not shown) reciprocable therein and has lead lines (not shown) which are connected to a suitable pump or other source of liquid under pressure carried by the vehicle. The piston has a shaft 26 projecting axially therefrom and from the cylinder 25. A pair of rigid arms 27 are welded or otherwise fixedly secured to the rock shaft 19 at the central portion thereof in normally downwardly extending relation thereto as best seen in Fig. 1. A rigid cross bar 28 extends between the lower free ends of the arms 27 and has pins 29 which are journaled in said arms 27.

The piston pin 26 is connected with the cross bar 28, the latter preferably having an opening through which the pin 26 extends freely for engagement of a shouldered portion 26' thereof with said cross bar. In the normal working position of the parts as illustrated in Fig. 1, the arms 27 extend at a slight inclination so that the normal adjustment of the parts incident to the pressures and loads exerted on the device tends to press said cross bar 28 against said shoulder 26.

Adjacent the opposite ends of the shaft 19 and preferably in outwardly spaced relation to arm 16 is welded or otherwise secured a pair of short rigid arms 30 which in the normal or operative position of the parts, as illustrated in Fig. 1, extend angularly upwardly and rearwardly from the shaft 19. At the outer ends of the shaft 19 a pair of links 31 are journaled and bear against abutments 32 fixed on said shaft outwardly of the arms 30. Any suitable means, such as cotterpins or the like, passing through openings 33 in the shaft may serve as means for preventing release of the links 31 from the shaft 19. The free end of each of the arms 30 journals a pin 34 which mounts a nut 35 at its outer end. This nut 35 adjustably receives the threaded end portion 36 of an L-shaped member having a laterally bent arm 37 which is received and pivoted in a suitable opening in the adjacent link 31. Consequently, the parts 34, 35, 36 and 37 provide adjustable means by which the links 31 are suspended at desired elevation or position with respect to the rigid arms 30, thereby permitting variation of the vertical position of the rear ends of the two links 31.

The body or frame of the vehicle rigidly mounts a bracket 40 above the level of the shaft 19 and preferably substantially equi-spaced from the two links 31. To this bracket 40 is pivoted at 41 a rigid link 42 which is preferably of substantially the same length as the two links 31.

Any suitable agricultural implement may be connected to the links 31 and 42, provided only that this implement be provided with a rigid frame or otherwise be adapted for connection with a lift type of mounting. As herein shown the implement 50 employed constitutes a plow 50 having a rigid frame 51 from which projects vertically a rigid A-frame 52. This A-frame has an apex portion or member 53 positioned in spaced relation above the draft line of the frame 51 and intermediate the width of said frame and may include a plurality of members inclined inwardly from the opposite sides and ends of the base frame 51. A pin 54 is provided at the apex portion 53 of the A-frame 52 for detachable connection of the link 42 therewith in a position inclined upwardly and rearwardly, as best illustrated in Fig. 1, in the normal adjustment of the parts. The links 31 are connected at opposite sides of the frame 51 in laterally spaced relation with the links 31 being substantially parallel, as illustrated in Fig. 6. At one side of the implement frame 51 the corresponding link 31 is pivoted to the frame by the adjustable mechanism best illustrated in Fig. 8. Thus, the frame member 51 is provided with a longitudinally elongated slot 55 in which a pin 56 is slidable, said pin preferably having an enlarged head 57 at one end thereof. An aperture 58 formed in the rear end of the adjacent link 31 fits freely and rotatably upon the pin 56 which is of a length to project beyond said link 31 and to have formed therein a radially screw threaded bore 59 at its outer end. The frame member 51 has a projection 60 adjacent to the slot 55. The projection 60 has an opening therein in which is journaled an elongated screw threaded member 61 which fits in and meshes with the threads of the bore 59. Shaft 61 may be provided with a crank handle 62. By means of this construction it will be apparent that the point along the longitudinal dimension of the frame 51 at which the rear end of the link 31 is connected may be varied. At the opposite side of the frame 51 a rigid pin is provided substantially in line with the center of the slot 55 for connection of the other link 31 therewith. This means is not illustrated in the drawing. Also, at the other side of the frame 51 is provided a depending bracket 63 of rigid construction having a pin 64 to which the link 31 may be connected at will. The purpose of providing two points of connection at the opposite side of the frame 51 from that shown will be set forth hereinafter.

The plow includes the conventional downwardly bent arm portion 65 rigidly mounted upon the frame 51 and serving to rigidly mount the plow blade 66 which is of the conventional construction.

The frame 51 of the plow also preferably provides means at 67 for connection of a rigid depending arm 68 to whose lower end is rigidly secured a rearwardly extending arm 69 for pivotal mounting at 70 of a coulter blade 71. In the preferred position of the parts the axis 70 of the coulter blade 71 will be substantially aligned vertically with the tip or point 72 of the plow blade when the frame 51 is in level or horizontal position as illustrated in Fig. 1, said coulter blade being spaced above the tip 72 of the plow blade 66. In the preferred form of the invention, the coulter blade has fixed thereto and concentric therewith a ground engaging rim or wheel portion 73.

The ground engaging rim 73 of the coulter blade serves as a means for controlling the working depth at which the plow operates, for which purpose the arm 69 may be adjusted upon the rod 68 to provide the desired depth setting of the plow. The operation of the parts for depth control in this connection entails a response of the wheel rim 73 to force acting along the line 74 between the tip of the plow and the ground engaging rim 73. This force acts to cause the rim 73 to ride at a level which may differ from the ground level 75. In actual practice it has been found that with the arrangement of the parts as above described, the force 74, which results from the initial displacement of the earth by the tip of the blade, causes the rim 73 to ride at a level slightly above the normal ground level 75. This prevents any tendency to press the earth between the rigidly or fixedly associated ground engaging wheel and plow blade and creates the effect of a floating or feeling contact between the wheel 73 and the ground as the implement is drawn by the tractive means. This is one of the important features of the invention utilized in conjunction with other features, to be mentioned hereinafter, for the purpose of automatically controlling the position and depth of the plow. In this connection it should be mentioned that the normal tendency of any plow blade when it is drawn through the ground is to dig itself to an ever lower depth. Therefore, the wheel 73 serves in part as a means to overcome this normal working reaction of the plow blade with the soil, which is sometimes called the suction effect of the plow.

The links 31 are preferably so connected to the frame 51 of the plow that the normal straight line towing or pull effect of said arms 31 is encountered when the plow blade 66 is slightly above its normal working position illustrated in Fig. 1. In other words, the parts are so related that when the plow blade 66 is at desired working depth, the links 31 are slightly inclined downwardly and rearwardly.

The related positions of the links 31 and 42 is illustrated in Fig. 1, wherein the rearward upward inclination of the link 42 relative to links 31 is observed. This feature, coupled with the fact that the links 31 and 42 are of substantially the same length, and the further fact that the pivotal point 41 for the link 42 is above and slightly rearward with respect to the position of the shaft 19, is important in the operation of the lift mechanism. The operation of the lift mechanism is controlled through the valve or other means in the fluid line (not shown) which leads to the cylinder 25. Thus, when the valve is turned to lifting position, the pressure within the cylinder 25 acts upon the piston in that cylinder to urge the shaft 26 of the piston rearwardly, thereby causing the shoulder 26' to push rearwardly against the cross bar 28 for the purpose of tilting the arms 27 rearwardly and upwardly to the position illustrated in Fig. 2. Inasmuch as the arms 27 are rigid upon the shaft 19 and the arms 30 are likewise rigid upon said shaft, the rocking of the shaft 19 by the arms 27 serves to swing arms 30 forwardly toward a vertical position as illustrated in Fig. 2. The suspension bolt 36 transmits this movement to the links 31, thereby swinging the rear ends of the same upwardly, as shown in Fig. 2. The upper link 42 swings about its center point 41 to a position illustrated in Fig. 2, which is characterized by both a bodily upward movement of the plow 50 and a vertical inclination of the frame 51 of the plow. Consequently, when the lift hitch mechanism reaches the end of its lift travel, the plow blade 66 and the coulter blade 71 are both spaced above the ground with ample clearance to permit the vehicle to travel along a roadway or over any surface without danger that the plow or implement will engage the ground. The vertical inclination of the frame 51 above described is proportional to the extent of lift. Thus, by referring to Fig. 3, it will be observed that when the lift mechanism is so positioned that the plow blade 66 is first starting to enter the ground, the frame 51 and the bottom surface 76 of the plow blade are tilted forwardly slightly with respect to the normal substantially horizontal position of said plow base 76 as shown in Fig. 1 and at an angle less than the full tilt angle of inclination of said base, as shown in Fig. 2. Likewise, by referring to Fig. 4, it will be observed that if, due to the occurrence of a dip or depression in the soil level 75 as at 77 or for any reason such as the suction effect of the plow aforementioned, the plow blade goes below normal working depth relative to soil level 75, the base 76 of the plow blade will incline forwardly and upwardly.

By a proper correlation and coordination of the adjustments and connection points of the parts, an automatic control of the depth at which the implement works is obtained. Specifically, when the linkage is so arranged that the angle or level of the plow base is correct for the desired working depth, and when the depth wheel 73 has been properly adjusted for that depth, and when the links 31 are so positioned that they are slightly depressed below the normal straight line pull action when the plow is at proper working depth, the device will operate automatically and mechanically to maintain that proper working depth as against the natural suction tendency of the plow to progressively dig deeper into the soil. The following points are to be noted particularly in this connection. As the plow is lowered into the ground it is lowered with its tip or point striking the ground first, thus facilitating the natural suction effect of the plow and permitting the plow rapidly to reach the desired working depth. However, as the plow blade penetrates into the ground with incident bodily lowering thereof, it progressively nears a level position until at the desired or normal working depth the base 76 of the plow is leveled off. If the plow attempts through its suction effect to penetrate deeper than normal, the further lowering of the plow tends, through the control of its longitudinal inclination by the links 31 and 42, to lower the rear end of the base of the plow relative to its tip whereby pressure is applied to the bottom of the plow as it moves forward in a manner to tend to lift the plow out of the ground until such time as it again returns to desired working level. By this coordination of the parts, the forces acting upon the various parts tend to counteract each other in an automatic manner which is solely mechanical and which does not require any operation of the power actuated mechanism of which the cylinder 25 is a part, as has been necessary in certain types of lift mechanisms heretofore proposed and manufactured.

One of the primary distinctions between an ordinary automotive vehicle and a farm tractor is the fact that the former is provided with suspension springs, such as the springs 14, whereas an ordinary farm tractor does not have such springs. The provision of such springs has heretofore been a disadvantage which has susbtantially prevented or retarded the use of spring suspension vehicles for pulling agricultural implements. This has been the result of the fact that as the tractive load has varied, the springs will yield, thereby making it very difficult as ground conditions vary to maintain uniform working action or working depth for the implement. By the instant construction of hitch mechanism, however, this disadvantage is overcome completely and is used to beneficial advantage for the purpose of maintaining working depth constant and for the further purpose of automatically adjusting the agricultural implement to prevent overload of the tractive vehicle.

Specifically, the action of the springs in the operation of the device is as follows: Assuming that the plow is working at normal depth, that the suction of the plow is normal, and that the depth rim 73 of the coulter is omitted, and that the plow suddenly runs into a hard spot in the ground, the plow will pull hard, that is, the tractive load which it imposes will be increased. This pull is exerted against the hitch and the line of pull is in the direction and at the angle designated by line 80 from the center of the load or the dirt being moved to the pivot point 19 of main pulling links 31. The angle of this line of force is rearward and downward from the pivot axis 19. The normal downward component of pull will be approximately 250 pounds for a single 16 inch bottom plow in the arrangement of the parts as illustrated. Now assuming that the springs 14 will deflect approximately one inch for a downward load of 200 pounds, it will be evident that the springs will normally deflect 1¼ inches for a normal load, and the plow therefore has to be set at normal suction to maintain good plowing when applying a tractive load of this value.

Now assuming that the plow strikes a heavy section of soil where the tractive load imposed is increased, the deflection of the springs will increase proportionally. Thus the load might be as much as double normal load which would deflect the springs approximately 2½ inches. This increased deflection tilts the longitudinal center line of the frame of the jeep rearwardly and downwardly. Since the plow is attached firmly by a three-point connection to the rear of the jeep the longitudinal line of the plow, for example, the plow frame 51, tends to change to substantially the same angle as the angular change in the center line of the tractive vehicle and also tends to similarly tilt its position with respect to ground level. The rear of the plow blade 66 tends to move to a lower level relative to the level of the tip of the blade incident to this operation, the tip of the blade probably being maintained at substantially normal depth. Therefore, since the tip of the plow blade is now slightly higher than the rear, pressure will be applied to the bottom 76 of the plow so upwardly inclined to lift the plow and thereby lighten the load. As a tractive load lightens the springs 14 will return to normal and the plow likewise will return to its normal position. However, if the ground continues heavy, thus holding the load on the springs 14, a balancing point will be found between the plow pulling load along line 80 and the suction of the plow. This action has been observed repeatedly in actual tests of this device. However, when the coulter depth rim 73 is utilized, an increase in load which deflects the springs causes the rim 73 to act as a fulcrum, so that as the level of the shaft 19 above the ground is lowered, the rear of the plow is raised as permitted by the flexible connection between the parts 26, 28. The plow is prevented by the depth rim from digging deeper, and the combination of reactions serves to position the plow to counterbalance the increase in load. Thus the hitch permits the plow to adjust itself to compensate for changes in the tractive load or pull exerted thereby when a depth wheel is used and when said depth wheel is omitted.

While the automatic balancing of the load accomplished as above described by virtue of the deflection of the vehicle springs 14 under an increase in tractive load constitutes a preferred embodiment of the invention, other means for accomplishing the same purpose are contemplated within the spirit of the invention. Thus any spring means incorporated in the hitch itself as between the mounting points of the hitch and the tractor vehicle, for example, a spring mounting of the shaft 19 to the vehicle to permit variation in the vertical position of that shaft 19 incident to changes in tractive loads, will produce the same advantages.

While the use of a depth wheel in the nature of the ground-engaging rim 73 of the coulter blade 71 is preferred for the advantages it provides, as outlined above, the arrangement is not essential and control of the working depth of the plow may be achieved by other means. One such means is illustrated in Fig. 5 wherein the depth control wheel 81 is mounted in laterally and rearwardly projecting relation to the plow blade 66 by means of suitable framework and mounting means which accommodate vertical adjustment of the axis of the wheel relative to the frame of the plow.

While the operation of the unit has been described with reference to its advantages and mode of operation, another point of advantage which should not be overlooked is the compactness of the parts of the hitch which are fixedly connected to the vehicle 10. Thus it will be observed that when the links 31 and 42 are disconnected at their pivot points 19 and 41, respectively, together with disconnection of the suspension means 36 from the links 31, the parts remaining upon the tractor are very close coupled with relation to the body of the tractor vehicle 10. In other words, the hitch parts which are permanently attached to the vehicle do not project to any material extent rearwardly from the vehicle. Thus the appearance of the vehicle having the hitch mechanism mounted thereon is not changed materially nor is the hitch mechanism particularly noticeable. Also, another obvious advantage of the construction is the fact that the lack of any substantial projection from the vehicle insures that ready access may be had to the rear of the vehicle body, such as the box portion 15, for the purpose of loading and unloading the same.

Another important advantage of the construction is that the attitude or position of the implement 50 may be changed to meet required working conditions. Thus it will be observed that the two pulling links 31 may extend at different angles from the shaft 19 and that a fine degree of adjustment of the angles of these two pulling links can be obtained by operation of the adjustable means for suspending said links from the arms 30. Specifically, the threaded adjustment of the screw threaded suspension rod 36 in the nut 35 swivelly carried by the arm 30 permits fine adjustment of the angular relation of the two links. This adjustment, of course, controls the lateral inclination of the frame 51 of the implement as may be required to meet operating conditions. The provision of two vertically spaced pins, of which the pin 64 is one, at one side of the frame also accommodates a wide or rough adjustment of lateral inclination of the implement. Among the purposes served by control of the lateral inclination of the implement is the adjustment necessary to level the base 76 of the plow blade for both the starting furrow and succeeding furrows. In the starting furrow it will be obvious that the wheels of the tractive member all rest upon level ground. In succeeding furrows the wheels at one side of the vehicle will fall within the preceding furrow thereby tilting the implement laterally. It is desirable that in all of these conditions the base 76 of the plow be substantially level or horizontal, and it is therefore plain that the lateral inclination of the implement must be changed after the first furrow has been completed and before the succeeding furrows are plowed.

In addition to the control of lateral inclination of the implement, as mentioned above, it is also necessary and desirable to control the longitudinal position of the implement which governs the angle of attack of the plow blade 66 with the earth. This control is effected by the mechanism illustrated in Fig. 8 which makes it possible to vary the point longitudinally of the implement frame 51 at which the pin 56, by which one of the links 31 is connected with the frame, is located. It will be understood that the mechanism illustrated in Fig. 8 is illustrative only of means by which the longitudinal location of the connection of one of the links 31 with the implement frame may be governed.

While the preferred embodiment of the invention has been illustrated herein, it will be understood that the invention may be embodied in other forms within its spirit and within the scope of the appended claims.

I claim:

1. The combination with a tractive vehicle and an implement to be drawn thereby, of a rock shaft, a mounting secured to said vehicle for journaling said shaft in transverse relation to said vehicle, a lever fixed to said shaft, an actuator carried by said vehicle and connected to and adapted to rotate said shaft, said shaft being rotatable in one direction independently of said actuator, a plurality of rigid links each pivotally connected to said implement and to said vehicle, and a rigid connector connecting an intermediate portion of one link with said lever, and spring means carried by said vehicle for controlling the elevation of said rock shaft above ground level responsive to variations in the downward component of the tractive load imposed on said vehicle and thereby varying the longitudinal tilt of the implement relative to the ground.

2. The combination with a wheeled tractive vehicle having a four-wheel drive and an implement to be drawn thereby, said vehicle including a chassis supported by springs, of a rock shaft, a mounting secured to said vehicle chassis for journaling said shaft in transverse relation to said vehicle, a lever fixed to said shaft, a plurality of rigid links each pivotally connected at opposite ends to said implement and to said vehicle, at least one of said links being pivoted to said chassis concentric with said rock shaft, whereby said links permit said implement to freely follow the contour of the ground, a rigid connector connecting an intermediate portion of a link with said lever, and an hydraulic actuator carried by said vehicle and operable to rock said shaft and raise and lower said links.

3. The combination with a tractive vehicle and an implement to be drawn thereby, of a flexible hitch connecting said implement to said vehicle and including at least three links each pivotally connected to said vehicle and to said implement at vertically and horizontally spaced points about axes substantially transverse of the direction of draft of said implement by said vehicle, an actuator selectively operable to pivot at least one of said links in a raising direction and oppositely operable to permit lowering of said links and implement under the force of gravity, spring means carried by said vehicle and cooperating with said vehicle and said hitch for controlling the elevation above ground level of the pivot connections of said links with said vehicle in response to variations in the downward component of the tractive load imposed upon said vehicle by said implement, whereby to vary the angle of attack of the implement relative to the ground.

4. The combination with a tractive vehicle and a plow having a rigid frame mounting a plow blade and also mounting a depth control wheel adapted to engage the ground and having its axis substantially above the point portion of the blade of the plow, of a hitch connecting said plow to said vehicle and including at least three links each pivotally connected to said vehicle and to said plow frame at vertically and horizontally spaced points about axes substantially transverse of the direction of draft of said plow by said vehicle, an actuator selectively operable to pivot at least one of said links in a raising direction and oppositely operable to permit lowering of said links and plow under the force of gravity, and spring means mounted on said vehicle in a manner to control the elevation above ground level of the pivot connections of said links with said vehicle in response to variations in the downward pull of the tractive load imposed upon said vehicle by said plow to thereby vary the angle of attack of the plow relative to the ground.

5. The combination with a tractive vehicle and a plow adapted to be drawn thereby and including a rigid frame, a plow blade carried by said frame and a ground-engaging wheel mounted on said frame rearwardly of the tip portion of said blade, of a hitch connecting said plow to said vehicle and including at least three links each pivotally connected to said vehicle and to said plow frame at vertically and horizontally spaced points about axes substantially transverse of the direction of draft of said plow by said vehicle, an actuator selectively operable to pivot at least one of said links in a raising direction and oppositely operable to permit lowering of said links and plow under the force of gravity, and spring means mounted on said vehicle and cooperating with said hitch for controlling the elevation above ground level of the pivot connections of said links with said vehicle and thereby varying the angle of attack of the plow relative to the ground in response to an increase of the tractive load imposed upon said vehicle by said plow.

6. A hitch adapted for attachment to a vehicle as a unit for connecting an implement to the vehicle, comprising a rock shaft, a mounting adapted to be secured to said vehicle for journaling said shaft in transverse relation to said vehicle, at least one lever fixed to said shaft, an actuator carried by said mounting, a plurality of rigid links each adapted to be pivotally connected to said implement and to said vehicle, and at least one rigid connector connecting an intermediate portion of a link with said lever, said actuator including a part adapted to rock said shaft in one direction to raise said links and implement and reversely operable to permit said links and implement to lower by gravity.

7. A hitch assembly adapted for unitary attachment to a vehicle for connecting an implement to the vehicle, comprising a rock shaft, a mounting adapted to be carried by said vehicle for journaling said shaft in transverse relation to said vehicle, at least one lever fixed to said shaft, an actuator adapted to be carried by said mounting and including a part connected to and adapted to rock said shaft in one direction only, a plurality of rigid links each adapted to be pivotally connected to said implement and to said vehicle, at least one link being rotatably mounted on said shaft, and a rigid extensible connector spaced from said shaft and pivoted at its opposite ends to said lever and to the link pivoted to said shaft.

8. A hitch assembly adapted for unitary mounting on a vehicle to connect an implement to the vehicle, comprising a rock shaft extending transverse of said vehicle, a mounting adapted to be carried by said vehicle for journaling said shaft spaced from its ends, a pair of levers fixed to said shaft adjacent to the opposite ends thereof, a pair of links adapted to be connected to said implement and each detachably journaled at one end on an end of said shaft, a pair of rigid connectors each carried by a lever and detachably connected to the adjacent link, a third link adapted to be pivoted at its opposite ends to said vehicle and said implement, and an hydraulic actuator adapted to be carried by said vehicle and connected to said shaft to rock the shaft in one direction only.

9. A hitch assembly adapted for attachment to a vehicle for connecting an implement to the vehicle, comprising a rock shaft having an offset abutment, a mounting adapted to be secured to said vehicle for journaling said shaft in transverse relation to said vehicle, a lever fixed to said shaft, a hydraulic actuator adapted to be carried by said vehicle and including a part having a lost motion connection with said shaft abutment and adapted to rock said shaft, a plurality of rigid links each adapted to be pivotally connected to said implement and to said vehicle, and a rigid connector connecting an intermediate portion of one link with said lever, said shaft being rotatable by said last named link in response to changes in the working position of said implement and independent of said actuator when said actuator is deenergized.

10. In combination, a motor vehicle having front and rear wheels, a vehicle body, and springs connecting said body and wheels, a ground working implement, a flexible lift-type shiftable hitch mechanism including at least three rigid links each pivotally connected at vertically and horizontally spaced points to said vehicle body and to said implement, and an actuator operable selectively to pivot at least one link in a raising direction and oppositely operable to permit lowering of said links and implement under the force of gravity, said vehicle springs yielding in different degrees as the tractive load imposed on said vehicle varies whereby the position of said vehicle body shifts relative to ground level upon load increase to shift the attitude of said hitch and said implement relative to ground level in load releasing direction.

JABEZ A. LOVE.

REFERENCES CITED

The following references are of record in the file of this patent:

UNITED STATES PATENTS

| Number | Name | Date |
| --- | --- | --- |
| 1,175,042 | Biebinger | Mar. 14, 1916 |
| 1,222,299 | Kardell | Apr. 10, 1917 |
| 1,614,673 | Hester | Jan. 18, 1927 |
| 1,628,372 | Strandlund | May 10, 1927 |
| 1,916,945 | Ferguson | July 4, 1933 |
| 2,035,150 | Dufour | Mar. 24, 1936 |
| 2,118,180 | Ferguson | May 24, 1938 |
| 2,195,515 | Ferguson | Apr. 2, 1940 |
| 2,302,502 | Morkoski et al. | Nov. 17, 1942 |
| 2,319,670 | Ego | May 18, 1943 |
| 2,332,739 | Mott | Oct. 26, 1943 |
| 2,368,156 | Orelind et al. | Jan. 30, 1945 |
| 2,381,552 | Mott | Aug. 7, 1945 |
| 2,409,509 | Mott | Oct. 15, 1946 |

FOREIGN PATENTS

| Number | Country | Date |
| --- | --- | --- |
| 157,713 | Great Britain | 1922 |
| 539,003 | Great Britain | Aug. 25, 1941 |
| 544,041 | Great Britain | Mar. 25, 1942 |
| 553,835 | Great Britain | June 8, 1943 |
| 345,516 | Germany | Dec. 14, 1921 |
| 494,166 | France | May 23, 1919 |